United States Patent
Jin et al.

(10) Patent No.: US 8,175,421 B2
(45) Date of Patent: May 8, 2012

(54) LABEL IMAGE EDITING APPARATUS, LABEL IMAGE EDITING PLOTTING SYSTEM, AND LABEL IMAGE EDITING PROGRAM STORAGE MEDIUM

(75) Inventors: Haomin Jin, Kanagawa (JP); Ryuji Hisanaga, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 903 days.

(21) Appl. No.: 12/293,390

(22) PCT Filed: Feb. 2, 2007

(86) PCT No.: PCT/JP2007/052295
§ 371 (c)(1),
(2), (4) Date: Sep. 17, 2008

(87) PCT Pub. No.: WO2007/116604
PCT Pub. Date: Oct. 18, 2007

(65) Prior Publication Data
US 2009/0103837 A1 Apr. 23, 2009

(30) Foreign Application Priority Data

Mar. 31, 2006 (JP) .................................. 2006-096913

(51) Int. Cl.
*G06K 9/03* (2006.01)
(52) U.S. Cl. ........ 382/311; 382/188; 382/173; 382/224; 382/225; 382/227; 386/95; 386/126
(58) Field of Classification Search .................. 382/311, 382/188, 173, 224, 225, 227; 386/95, 126
See application file for complete search history.

(56) References Cited

U.S. PATENT DOCUMENTS

| 5,706,097 | A | 1/1998 | Schelling et al. |
| 6,019,151 | A * | 2/2000 | Wen et al. ..................... 156/387 |
| 2003/0194214 | A1 | 10/2003 | Anderson et al. |
| 2005/0183010 | A1* | 8/2005 | Iwasaki .......................... 715/517 |
| 2005/0249068 | A1 | 11/2005 | Sugahara et al. |
| 2005/0254092 | A1* | 11/2005 | Lee .............................. 358/1.18 |

FOREIGN PATENT DOCUMENTS

| JP | 2005-248882 A | 9/2005 |
| JP | 2005-276313 A | 10/2005 |
| JP | 2005-310241 A | 11/2005 |

OTHER PUBLICATIONS

JP Communication, dated May 12, 2009, issued in corresponding JP Application No. 2006-096913, 3 pages in Japanese.
International Search Report, mailed May 22, 2007, in Intern'l Application No. PCT/JP2007/052295, 2 pages.
Written Opinion, mailed May 22, 2007, in Intern'l Application No. PCT/JP2007/052295, 5 pages.

\* cited by examiner

*Primary Examiner* — Mike Rahmjoo
(74) *Attorney, Agent, or Firm* — Sughrue Mion, PLLC

(57) ABSTRACT

There is disclosed a label image editing apparatus for editing a label image on a recording media having a data side on which data is recorded, and a label side on which a label image is plotted to visually confirm recording contents on the data side. The label image editing apparatus comprises: a data analyzing section that analyzes data to be recorded on the recording media and/or data to be reproduced from the recording media; and a layout display section that displays, as a layout of the label image, a layout according to an analyzing result by the data analyzing section.

11 Claims, 11 Drawing Sheets

LABEL IMAGE EDITING APPARATUS, LABEL IMAGE EDITING PLOTTING SYSTEM, AND LABEL IMAGE EDITING PROGRAM STORAGE MEDIUM

TECHNICAL FIELD

The present invention relates to a label image editing apparatus for editing a label image on a recording media having a data side on which data is recorded, and a label side on which a label image is plotted to visually confirm recording contents on the data side, a label image editing plotting system for editing the label image to plot the edited label image on the label side of the recording media, and a label image editing program storage medium for storing a label image editing program which causes a computer to operate as the label image editing apparatus as mentioned above.

BACKGROUND ART

Recently, as recording media for recording various kinds of data such as image data, dynamic picture data, audio data, and text data, for instance, CD-R (Compact Disk Recordable), CD-RW (Compact Disk Rewritable), and DVD (Digital Versatile Disk) have come into wide use. Many of such recording media has a data side on which data is recorded, and a label side on which a label image is drawn to visually confirm recording contents such as a title of the music represented by the voice data, and a name of the composer for instance, the label side being opposite to the data side.

As a method of drawing a label image on the label side, there are known, for instance, a method of indirectly drawing a label image on the label side in such a way that a seal, on which the label image is printed, is affixed to the label side, and a method of directly drawing a label image on the label side by the use of an ink jet printer and the like. Moreover, recently, there are proposed a recording media having a recording side on which data is recorded with light, and a label side on which a label image is drawn with light, and an apparatus for drawing the label image on the label side of the recording media.

As a method of reducing the user's load in the edit of such a label image, the following methods are proposed. For example, there is proposed a method in which two or more image parts to be used as a material of the label image are stored beforehand in a predetermined database in association with various types of data, and when data is recorded on a recording media, image parts, which are associated with the data in the database, are combined in a predetermined layout, so that the label image is edited (for example, Japanese Patent Laid Open Gazette TokuKai. 2005-276313). Moreover, there is proposed a technology that a recording media, on which data representative of the catalog and the like, is used as a visiting card (for example, Japanese Patent Laid Open Gazette TokuKai. 2005-248882). According to this technology, a label image, in which image parts such as company names and person names are combined in a layout of the visiting card, is printed on the label side.

According to the technologies disclosed in Japanese Patent Laid Open Gazette TokuKai. 2005-276313 and Japanese Patent Laid Open Gazette TokuKai. 2005-28882, the user's load is reduced in the point that a label image is automatically edited.

However, the later technology is concerned with a restricted technology that the recording media is used as the visiting card. Accordingly, this technology involves such a problem that it is impossible to simply apply the technology to editing of various label images. On the other hand, the former technology can be applied to editing of various label images. However, the former technology involves such a problem that the label image, which is edited in a previously determined layout, is not always preferable in the points of the easiness of information to see and externals on the label side.

DISCLOSURE OF THE INVENTION

In view of the foregoing, it is an object of the present invention to provide a label image editing apparatus capable of easily editing a preferable label image, a label image editing plotting system capable of easily editing the preferable label image to plot the edited label image on the label side of the recording media, and a label image editing program storage medium for storing a label image editing program which causes a computer to operate as the label image editing apparatus as mentioned above.

To achieve the above-mentioned object, the present invention provides a label image editing apparatus for editing a label image on a recording media having a data side on which data is recorded, and a label side on which a label image is plotted to visually confirm recording contents on the data side, the label image editing apparatus comprising:

a data analyzing section that analyzes data to be recorded on the recording media and/or data to be reproduced from the recording media; and a layout display section that displays, as a layout of the label image, a layout according to an analyzing result by the data analyzing section.

In the label image editing apparatus according to the present invention as mentioned above, it is typical that the label image editing apparatus further comprises an image creating section that creates the label image using the layout displayed by the layout display section.

In the label image editing apparatus according to the present invention as mentioned above, it is typical that the label image editing apparatus further comprises an image creating section that creates the label image on the layout displayed by the layout display section in accordance with an operation.

According to the label image editing apparatus of the present invention as mentioned above, as the layout of the label image, there is displayed a layout reflecting the recording contents of the recording media, that is, data to be recorded on the recording media and/or data to be reproduced from the recording media. Accordingly, such a typical use that the displayed layout is used to create the label image, or the label image is created on the displayed layout in accordance with an operation, makes it possible to edit a preferable label image which reflects the recording contents of the recording media.

In the label image editing apparatus according to the present invention as mentioned above, it is preferable that the label image editing apparatus further comprises a layout selecting section that selects, from among two or more candidates of the layout, a layout according to an analyzing result by the data analyzing section, and the layout display section displays the layout selected by the layout selecting section.

In the label image editing apparatus according to the present invention as mentioned above, it is preferable the data analyzing section classifies data into two or more types in accordance with a prescribed classification rule, and determines the type with most numbers of data, the label image editing apparatus further comprises a layout selecting section that selects, from among two or more layouts associated with said two or more types, respectively, a layout corresponding to the type determined by the data analyzing section, and the layout display section displays the layout selected by the layout selecting section.

According to the label image editing apparatus according to the present invention as mentioned above, it is possible to select a layout on which the analyzing result by the data analyzing section is suitably reflected, from two or more candidates of the layout or two or more layouts associated with the above-mentioned two or more types, and thus it is possible to surely edit a preferable label image which reflects the recording contents of the recording media.

In the label image editing apparatus according to the present invention as mentioned above, it is preferable that the label image editing apparatus further comprises a layout correcting section that corrects a basic layout, which is a base of the layout, in accordance with an analyzing result by the data analyzing section, and the layout display section displays the layout corrected by the layout correcting section.

In the label image editing apparatus according to the present invention as mentioned above, it is preferable that the data analyzing section classifies data into two or more types based on a prescribed classification rule, and determines numbers of data of individual type, the label image editing apparatus further comprises a layout correcting section that corrects an area of a description column of a basic layout, where description column for each two or more of the types is provided, in accordance with the numbers of data of individual type determined by the data analyzing section, and the layout display section displays the layout corrected by the layout correcting section.

According to the label image editing apparatus according to the present invention as mentioned above, the analyzing result by the data analyzing section is suitably reflected on the correction by the layout correcting section, and thus it is possible to surely edit a preferable label image which reflects the recording contents of the recording media.

In the label image editing apparatus according to the present invention as mentioned above, it is preferable that the data is data to which a name is fixed, and the data analyzing section has two or more keywords associated with two or more types, respectively, and determines a type with most data in which the associated keyword is used for at least part of the name among said two or more types.

According to the label image editing apparatus according to the present invention as mentioned above, the name, which is applied to data of the recording object for the recording media, is suitably reflected on the type determined by the data analyzing section. Therefore, according to the label image editing apparatus according to the present invention as mentioned above, it is possible to reflect the recording contents of the recording media on the label image.

In the label image editing apparatus according to the present invention as mentioned above, it is preferable that the data analyzing section classifies data into two or more types in accordance with a classification rule according to an operation among a predetermined plurality of classification rules.

According to the label image editing apparatus according to the present invention as mentioned above, the user's intention is reflected on the classification in the data analyzing section through the operation. Therefore, according to the label image editing apparatus according to the present invention as mentioned above, it is possible to reflect the user's intention on the label image.

Moreover, the label image editing apparatus according to the present invention as mentioned above can correspond to the recording media of various types such as the recording media of the type that the seal and the like on which the label image is printed are stuck on the label side, or the record media of the type that the label image is plotted by an inkjet printer and the like on the label side.

In the label image editing apparatus according to the present invention as mentioned above, it is preferable that the recording media has a data side on which data is recorded on with light, and a label side on which a label image is plotted with the light.

According to the label image editing apparatus according to the present invention as mentioned above, it is possible to perform the recording of the data and the plotting of the label image by the use of the same light, and thereby contributing to simplification of the apparatus.

To achieve the above-mentioned object, the present invention provides a label image editing plotting system comprising:

a label image editing apparatus for editing a label image on a recording media having a data side on which data is recorded, and a label side on which a label image is plotted to visually confirm recording contents on the data side, the label image editing apparatus comprising: a data analyzing section that analyzes data to be recorded on the recording media and/or data to be reproduced from the recording media; and a layout display section that displays, as a layout of the label image, a layout according to an analyzing result by the data analyzing section; and a label image plotting apparatus for plotting on the label side the label image edited by the label image editing apparatus.

According to the label image plotting system according to the present invention as mentioned above, it is possible to readily edit a desirable label image by the label image editing apparatus in the label image editing plotting system, and the label image plotting apparatus can plot the desirable label image on the label side.

To achieve the above-mentioned object, the present invention provides a label image editing program storage medium storing a label image editing program which causes a computer to operate as a label image editing apparatus, when the label image editing program is incorporated and executed in the computer, wherein the label image editing apparatus comprising:

a data analyzing section that analyzes data to be recorded on the recording media and/or data to be reproduced from the recording media; and a layout display section that displays, as a layout of the label image, a layout according to an analyzing result by the data analyzing section.

According to the label image editing program storage medium according to the present invention as mentioned above, it is possible to readily implement the label image editing apparatus that is capable of readily editing a preferable label image.

It is acceptable that the label image editing program storage medium of the present invention is a hard disk, a memory chip or the like as well as a flexible disk (FD), CD-R, CD-RW, MO, and DVD.

With respect to the label image editing plotting system of the present invention, and the label image editing program storage medium of the present invention, only the basic aspects are disclosed here. It is noted that the label image editing plotting system of the present invention, and the label image editing program storage medium of the present invention include not only the basic aspects, but also various aspects corresponding to the above-mentioned aspects of the label image editing apparatus of the present invention.

BEST MODE FOR CARRYING OUT THE INVENTION

Embodiments of the present invention will be described with reference to the accompanying drawings hereinafter.

Figure 1:
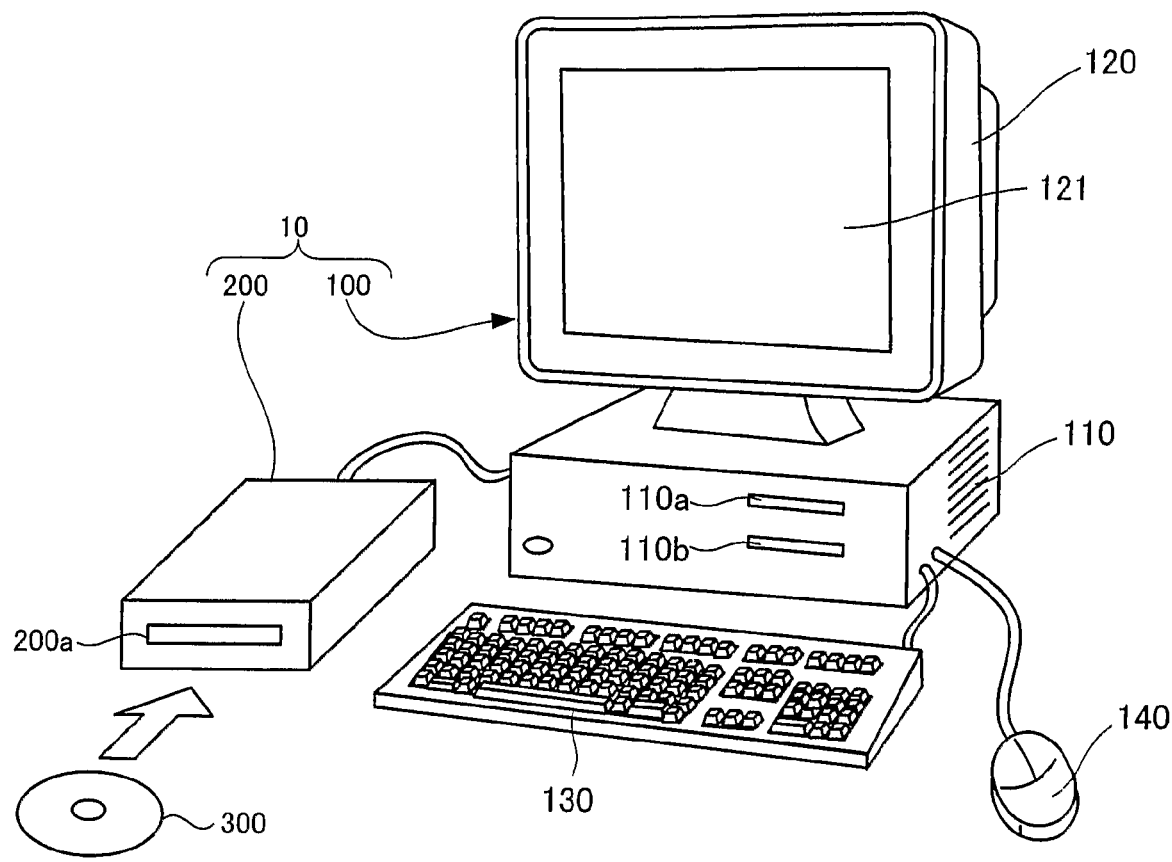
FIG. 1 is a perspective view of a computer system which operates as an embodiment of a label image editing plotting system of the present invention.

FIG. 1 is a perspective view of a computer system which operates as an embodiment of a label image editing plotting system of the present invention.

A computer system 10 comprises a personal computer 100 and a DVD drive 200 which is connected to the personal computer 100.

The personal computer 100 serves as an embodiment of a label image editing plotting system of the present invention, as will be described. The personal computer 100 comprises, on an external appearance, a main frame unit 110, an image display unit 120 for displaying an image on a display screen 121 in accordance with an instruction from the main frame unit 110, a keyboard 130 for inputting various sorts of information to the main frame unit 110 in accordance with a key operation, and a mouse 140 for inputting an instruction according to, for example, an icon and the like, through designation of an optional position on the display screen 121, the icon and the like being displayed on the position on the display screen 121. The main frame unit 110 has, on an external appearance, a FD (flexible disk) mounting slot 110a for mounting FD, and a CD-ROM mounting slot 110b for mounting a CD-ROM.

The DVD drive 200 corresponds to the label image plotting apparatus referred to in the present invention. The DVD drive 200 has, on an external appearance, a DVD mounting slot 200a for mounting a DVD. The DVD drive 200 is associated with a label plotting type of DVD 300 that has a data side on which data is recorded on an optical basis, and a label side on which a label image is plotted on an optical basis. The DVD drive 200 has a function of recording of data onto the data side by a laser beam for the DVD 300, and a function of executing the plotting of the label image onto the label side by the laser beam. According to the DVD drive 200, when the data is recorded, as for the DVD 300, the data side is made to downward in the figure and loaded, and the label side is made to downward and loaded oppositely at the time of plotting of the label image. The label plotting type of DVD 300 corresponds to an example of the recording media referred to in the present invention.

Hereinafter, there will be explained the internal structure of the DVD drive 200.

Figure 2:
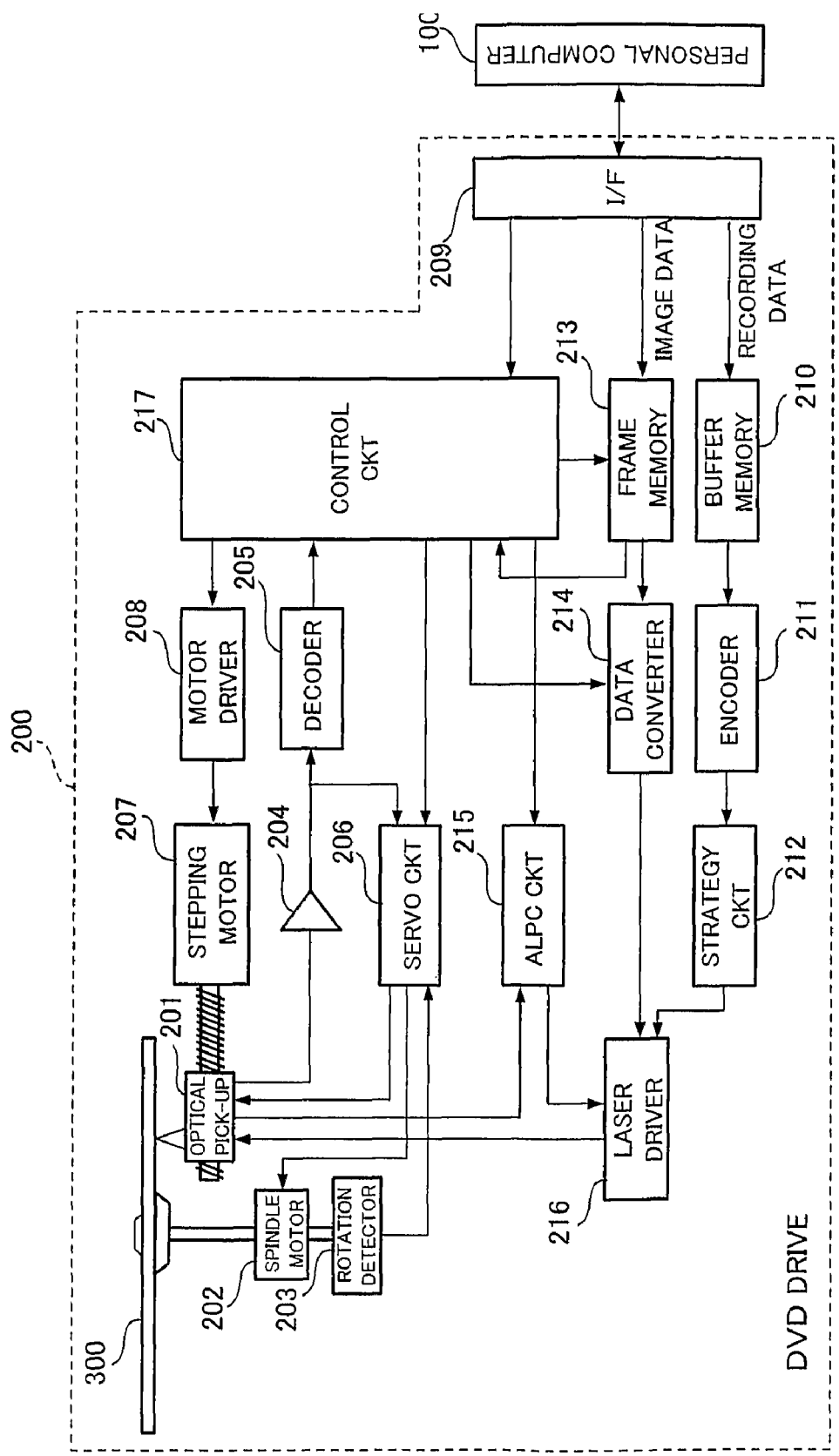
FIG. 2 is a hardware block diagram showing an internal structure of the DVD drive 200 shown in FIG. 1.

FIG. 2 is a hardware block diagram showing the internal structure of the DVD drive 200 shown in FIG. 1.

The DVD drive 200 shown in FIG. 2 comprises an optical pick-up 201, a spindle motor 202, a rotation detector 203, an RF (Radio Frequency) amplifier 204, a decoder 205, a servo circuit 206, a stepping motor 207, a motor driver 208, an interface circuit 209, a buffer memory 210, an encoder 211, a strategy circuit 212, a frame memory 213, a data converter 214, a laser power automatic control (Automatic Laser Power Control: ALPC) circuit 215, a laser driver 216, and a control circuit 217. The DVD drive 200 is connected via the interface circuit 209 to the personal computer 100 also shown in FIG. 1.

First of all, there will be explained recording of data onto the DVD 300 in the DVD drive 200.

As mentioned above, the DVD drive 200 is associated with the label plotting type of DVD. The DVD 300, which is mounted onto the DVD drive 200, has a data side on which data is recorded on an optical basis, and a label side on which a label image is plotted on an optical basis.

When data is recorded, the DVD 300 turns the data side below so that the data side may face the optical pick-up 201 and is loaded into the DVD drive 200. The thus loaded DVD 300 is driven by the spindle motor 902 in the state that it is held by a holding mechanism (not illustrated). At that time, a rotary speed optimal to the recording is transmitted from the control circuit 217 to the servo circuit 206. Moreover, the rotation detector 203 detects the rotary speed of the spindle motor 202, and transmits also a speed signal representative of the rotary speed from the rotation detector 203 to the servo circuit 206. The servo circuit 206 compares both of the rotary speed and the speed signal with one another, and controls the rotary speed of the spindle motor 202 so that the rotary speed represented by the speed signal becomes the rotary speed optimal to the recording.

When the laser beam is projected from the optical pick-up 201 onto the data side of the thus controlled DVD 300, data is recorded on the data side. The optical pick-up 201 has an optical system which comprises a laser diode, a light receiving element, and a condensing lens. Recording of data is performed by a laser beam that is emitted from the laser diode and is condensed by the condensing lens. The optical pick-up 201 has further a servo mechanism for performing a fine positioning for the condensed laser beam on the data side, and a focus mechanism for performing a focus control for the condensing lens. Operations for those mechanisms are controlled by the servo circuit 206 according to the instruction from the control circuit 217, so that the laser beam, which is exactly condensed, is exactly projected onto a target position on the data side of the DVD 300. At that time, light intensity of the laser, which is optimal to recording, is transmitted from the control circuit 217 to the ALPC circuit 215. The optical pick-up 201 has furthermore a sensor for monitoring intensity of the laser beam emitted from the laser diode. When the laser diode emits the laser beam, the intensity of the laser beam, which is monitored by the sensor, is also transmitted to the ALPC circuit 215. The ALPC circuit 215 compares both of the light intensity of the laser, which is optimal to recording, and the intensity of the laser beam, which is monitored by the sensor, with one another, and transmits to the laser driver 216 a control signal for causing the intensity of the laser beam emitted from the laser diode to be coincident with the light intensity of the laser, which is optimal to recording.

The data to be recorded onto the DVD 300 is supplied from the personal computer 100 via the interface circuit 209, and is temporarily stored in the buffer memory 210. The data stored in the buffer memory 210 is suitably read by the encoder 211, and is converted into encoded data suitable for recording onto the DVD 300 in accordance with a predetermined processing. The encoded data is supplied to the strategy circuit 212 so as to apply correction processing such as time axis correction. The encoded data, which is subjected to such a correction processing, is supplied to the laser driver 216. The laser driver 216 generates a driving signal to drive the laser diode of the optical pick-up 201 in accordance with the encoded data which is subjected to the correction processing, and transmits the driving signal to the optical pick-up 201. When the optical pick-up 201 projects to the data side the laser beam modulated in accordance with the encoded data, the encoded data is recorded on the data side with a mark generated by the irradiation of the laser beam. When the laser driver 216 generates a driving signal, the control signal transmitted from the ALPC circuit 215 reflects on the driving signal. Thus, it is possible to always perform recording of data with the optimal light intensity of the laser.

Next, there will be explained reproduction of the data recorded on the DVD 300 in the DVD drive 200.

Also when data is reproduced, the DVD 300 is loaded in such a manner that the data side may face the optical pick-up 201, so that the DVD 300 rotates at the optimal rotary speed by the spindle motor 202.

At the time of reproduction of data, the laser diode of the optical pick-up, 201 emits light, and the laser beam reflected on the data side of the DVD 300 is received by the light receiving element of the optical pick-up 201. At that time, the intensity of the laser beam reflected on the data side of the DVD 300 is varied in accordance with the existence of the mark on the data side. The existence of the mark is associated with the above-mentioned encoded data. Accordingly, photo data, which is obtained when the light receiving element receives the laser beam reflected on the data side, becomes encoded data equivalent to the encoded data which is recorded on the data side. The photo data, which is obtained by the light receiving element, is amplified by the RF amplifier 204, and then transmitted to the decoder 205. The decoder 205 applies a predetermined decoding processing to the received photo data, so that data is reproduced from the photo data, and then transmitted to the control circuit 217. The control circuit 217 transmits the reproduced data via the interface circuit 209 to the personal computer 100.

Next, there will be explained plotting of the label image onto the DVD 300 in the DVD drive 200.

As mentioned above, the DVD 300 to be loaded onto the DVD drive 200 has the label side in which a label image is plotted with light used for recording of data onto the data side. For plotting of the label image onto the label side, the optical pick-up 201 for performing recording of data is used. When plotting of the label image is carried out, the DVD 300 turns the data side below so that the data side may face the optical pick-up 201 and is loaded into the DVD drive 200.

The image data representative of the label image is supplied from the personal computer 100 via the interface circuit 209 so as to be temporarily stored in the frame memory 213. The image data stored in the frame memory 213 is suitably read by the data converter 214, so that the label image represented by the image data is converted into tone image data represented with a tone value. The tone image data is supplied to the laser driver 216. The laser driver 216 generates a driving signal that drives the laser diode of the optical pick-up 201 in accordance with the tone image data.

The label side of the DVD 300 used in the present embodiment has a label color wherein a portion irradiated with a light is thinned. The number of the irradiation frequencies of light is larger; thinness of the label color is more enhanced. According to the present embodiment, the label side of the DVD 300, which is rotary-driven, is repeatedly scanned with the laser beam that is turned on/off suitably by the driving signal, in accordance with tone values of individual portions of the label image represented by the tone image data. As a result, the laser beam is projected onto portions associated with the individual portions of the label image in the label side by the number of frequencies according to the tone values of individual portions of the label image. Thus, the label colors of the individual portions of the label image are suitably thinned so that the label image is plotted.

The above-mentioned explanation is concerned with the structure of the DVD drive 200.

Next, there will be explained editing of the label image.

According to the present embodiment, when the personal computer 100, which is connected to the DVD drive 200, operates as an embodiment of a label image editing apparatus of the present invention, the editing of the label image is performed.

Figure 3:
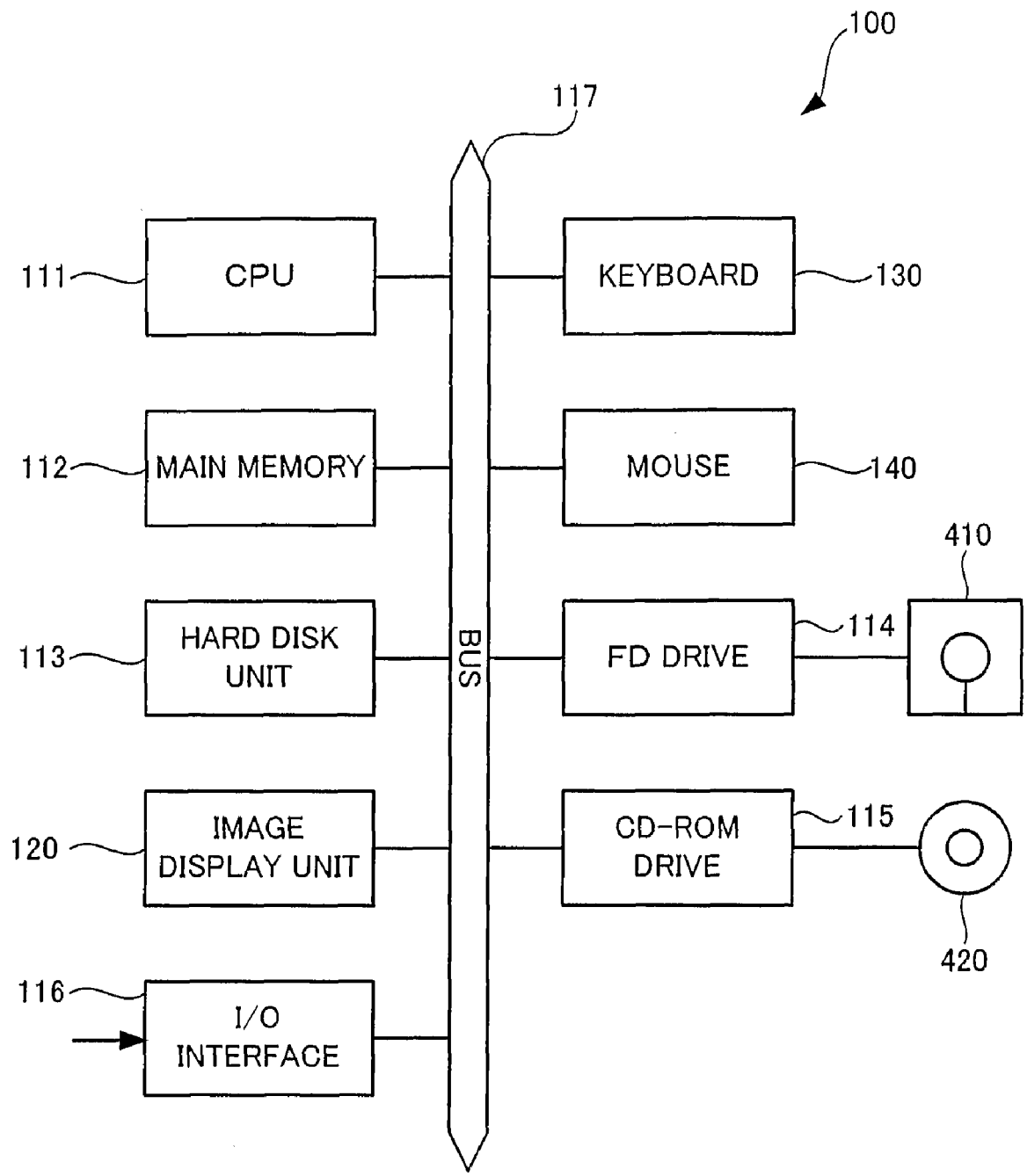
FIG. 3 is a hardware structural view of the personal computer 100 shown in FIG. 1 and FIG. 2.

FIG. 3 is a hardware structural view of the personal computer 100 shown in FIG. 1 and FIG. 2.

The main frame unit 110 (cf. FIG. 1) of the personal computer 100 comprises, as shown in FIG. 3, a CPU 111 for executing a various types of program, a main memory 112 in which a program stored in a hard disk unit 113 is read out and developed for execution by the CPU 111, the hard disk unit 113 for saving various types of programs and data, an FD drive 114 for accessing a FD 410 mounted thereon, a CD-ROM drive 115 for accessing a CD-ROM 420 mounted thereon, and an I/O interface 116 connected to the DVD 200 of FIG. 1, to receive and transmit data. These various types of elements are connected via a bus 117 to the image display unit 120, the keyboard 130 and the mouse 140.

The CD-ROM 420 corresponds to an embodiment of a label image editing program storage medium for storing a label image editing program which causes the personal computer 100 to operate as the label image editing apparatus.

When the CD-ROM 420 is mounted on the CD-ROM drive 115, the program stored in the CD-ROM 420 is up loaded onto the personal computer 100 so that the program is written into the hard disk unit 113. Thus, the personal computer 100 operates as the label image editing apparatus.

Next, there will be explained an embodiment of a label image editing program, and an embodiment of a label image editing program storage medium for storing the label image editing program of the present invention.

Figure 4:
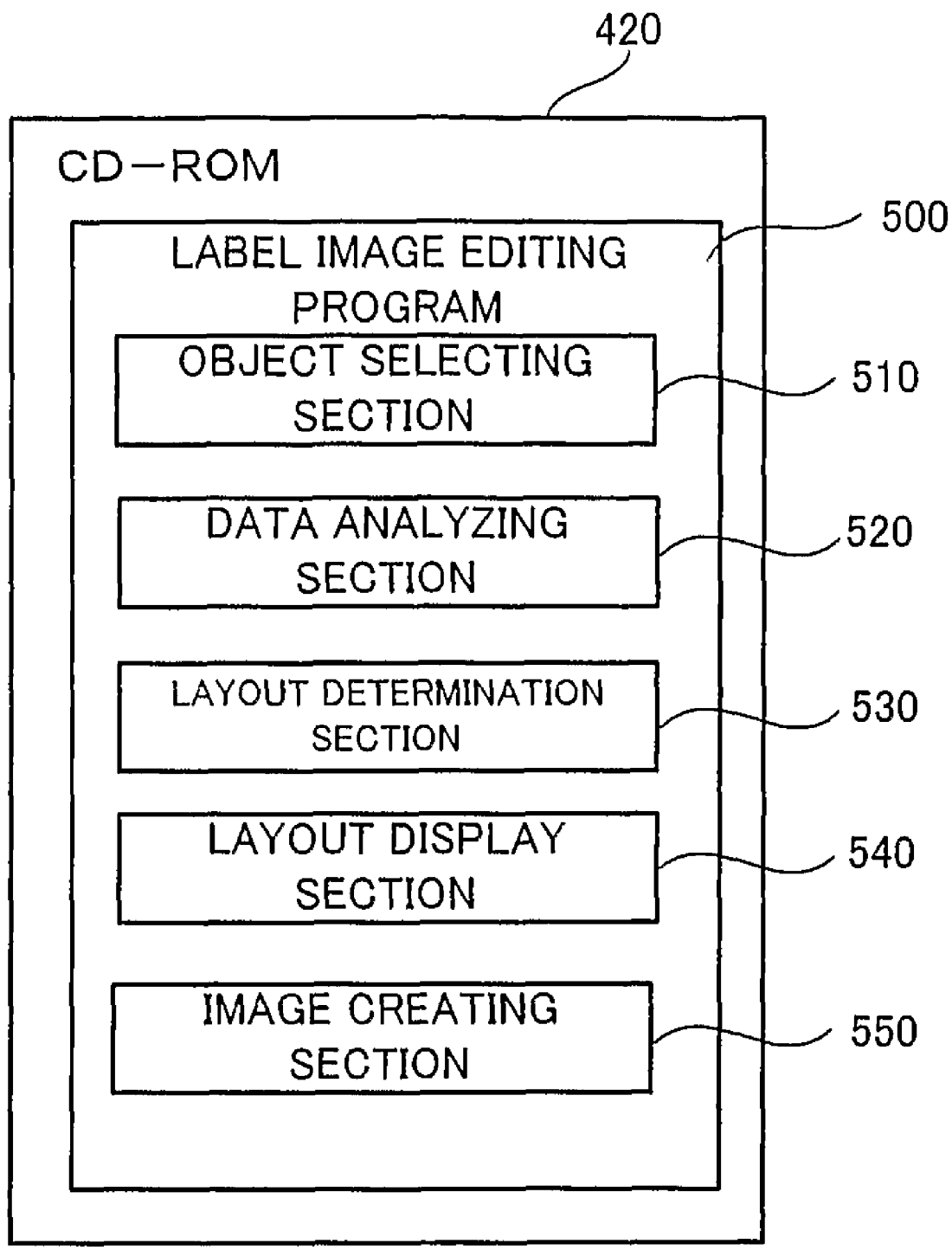
FIG. 4 is a conceptual view showing an embodiment of a label image editing program storage medium storing a label image editing program according to the present invention.

FIG. 4 is a conceptual view showing an embodiment of a label image editing program storage medium storing a label image editing program according to the present invention.

The CD-ROM 420 shown in FIG. 4 stores a label image editing program 500 and corresponds to an embodiment of a label image editing program storage medium according to the present invention.

The label image editing program 500 comprises an object selecting section 510, a data analyzing section 520, a layout determination section 530, a layout display section 540, and an image creating section 550.

Details of individual sections of the label image editing program 500 will be explained in conjunction with functions of individual sections of the label image editing apparatus according to the embodiment of the present invention. In the following figures, the same parts are denoted by the same reference numbers as those of FIG. 1 to FIG. 4.

Figure 5:
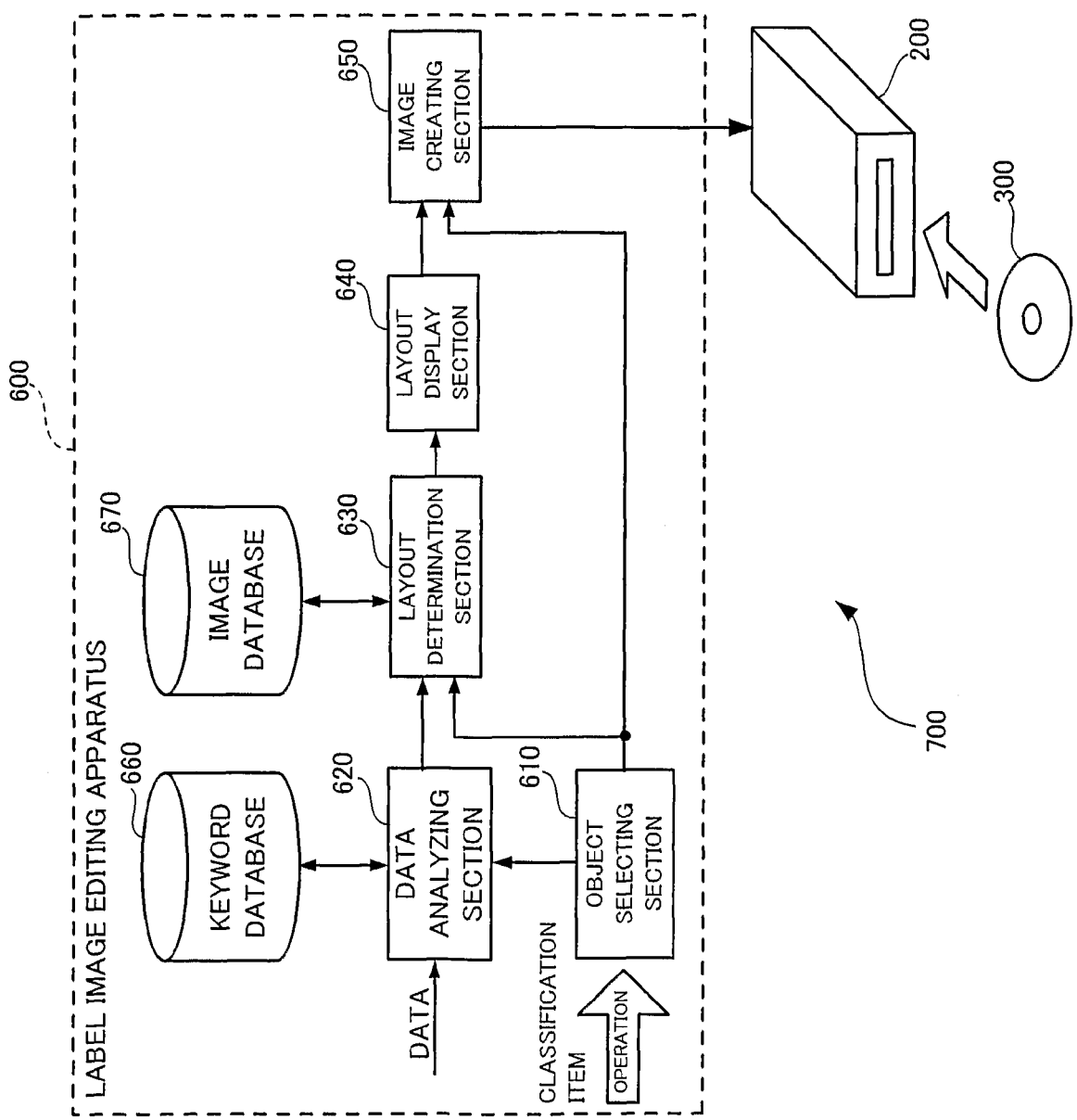
FIG. 5 is a functional block diagram of an embodiment of a label image editing plotting system of the present invention, which is provided with an embodiment of a label image editing apparatus of the present invention.

FIG. 5 is a functional block diagram of an embodiment of a label image editing plotting system of the present invention, which is provided with an embodiment of a label image editing apparatus of the present invention.

A label image editing apparatus 600, which is an embodiment of a label image editing apparatus of the present invention, is constructed when the label image editing program 500 shown in FIG. 4 is installed into the personal computer 100 shown in FIG. 1 and executed. The label image editing apparatus 600 has an object selecting section 610, a data analyzing section 620, a layout determination section 630, a layout display section 640, an image creating section 650, a keyword data base 660, and an image data base 670. Moreover, FIG. 5 shows the DVD drive 200 that is also shown in FIG. 1 and FIG. 2. The combination of the label image editing apparatus 600 and the DVD drive 200 constitutes a label image editing plotting system 700 which is an embodiment of the label image editing plotting system of the present invention.

When the label image editing program 500 shown in FIG. 4 is installed in the personal computer 100 shown in FIG. 1, the object selecting, section 510, the data analyzing section 520, the layout determination section 530, the layout display section 540, and the image creating section 550, of the label image editing program 500 constitute the object selecting section 610, the data analyzing section 620, the layout determination section 630, the layout display section 640, and the image creating section 650, of the label image editing apparatus 600 shown in FIG. 5, respectively. While the individual elements of the label image editing apparatus 600 are constructed by the combination of software of a computer and OS or application program to be executed in the computer, the individual elements of the label image editing program 500 shown in FIG. 4 are constructed by only the application program.

A combination of the object selecting section 610 and the data analyzing section 620 in the label image editing apparatus 600 corresponds to an example of the data analyzing section referred to in the present invention. The layout determination section 630 in the label image editing apparatus 600 corresponds to an example in which it serves both as the layout selecting section and the layout correcting section referred to in the present invention. The layout display section 640 and the image creating section 650 in the label image editing apparatus 600 correspond to examples of the layout display section and the image creating section referred to in the present invention, respectively.

Hereinafter, there will be explained individual elements of label image editing apparatus 600 shown in FIG. 5, and in addition explained individual elements of label image editing program 500 shown in FIG. 4.

The object selecting section 610 first presents the user two or more uses of the DVD 300 like the record of the regional information of various places and the record of information concerning music, etc. on the operation screen as not shown in the figure. And the object selecting section 610 urges the user to select use of the DVD 300 from among the two or more uses. When the user operates the operation screen and selects one of two or more uses now presented, the object selecting section 610 recognizes use of the DVD 300. The object selecting section 610 informs the data analyzing section 620 and the layout determination section 630 of the recognized use.

Moreover, the object selecting section 610 obtains a title for the DVD 300, a name of a person who creates DVD in which data is recorded on the DVD 300, and the created date of the data recorded DVD, through the operation screen as not shown in the figure, and informs the layout determination section 630 of those together with the classification items.

The data analyzing section 620 first receives data to be recorded on the DVD 300 and data to be reproduced from the DVD 300. While it is not specified as to how data inputted to the data analyzing section 620 is obtained, it is acceptable that the data is for example one in which data recorded on the hard disk unit 113 of the personal computer 100 as the use for recording for the DVD 300 is read out from the hard disk unit 113, or alternatively one in which data recorded on the DVD 300 is reproduced by the DVD drive 200.

According to the present embodiment, the data is treated in the form addressed as a file to which a file name is applied. The file corresponds to an example of "data applied with a name" referred to in the present invention. The file name corresponds to an example of the name referred to in the present invention. The data analyzing section 620 performs the following processing for the keyword database 660 in accordance with the use informed from the object selecting section 610 and the file name inputted to the data analyzing section 620.

Figure 6:
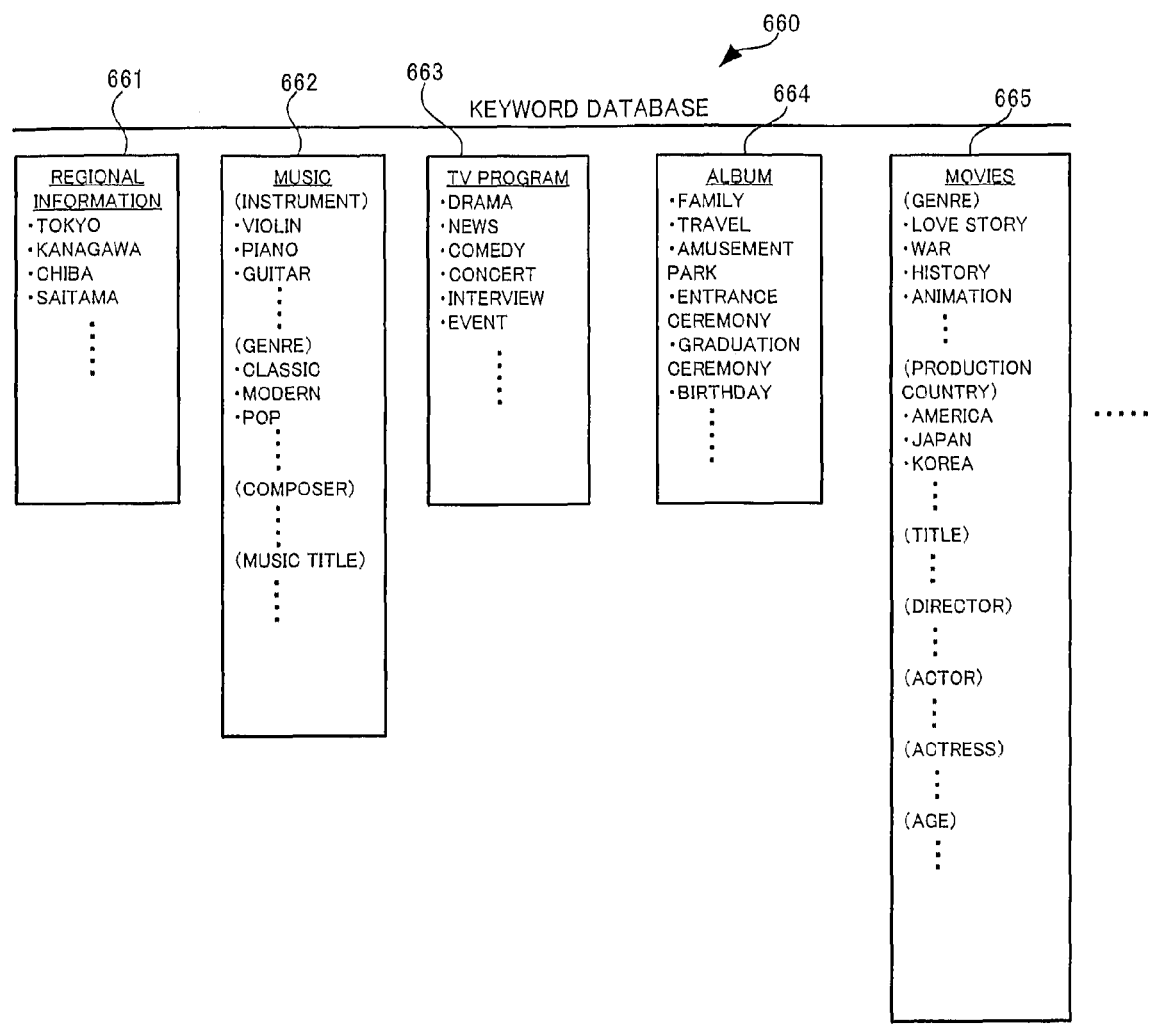
FIG. 6 is a typical illustration showing the internal parts of keyword database 660.

FIG. 6 is a typical illustration showing the internal parts of the keyword database 660.

The keyword database 660 has a storage area of the key word for each of two or more above-mentioned uses. Each two or more key words stored in each storage area is associated with each two or more data types belonging to use associated with the storage area.

For instance, a regional word storage area 661 provided regarding use of record of regional information is shown in FIG. 6. The regional word storage area 661 stores therein place names in form of keywords associated with two or more data types belonging to use of record of regional information, for instance, in such a manner that "the Tokyo metropolitan area" is stored in form of a keyword associated with a data type addressed as regional information of the Tokyo metropolitan area, "Kanagawa Prefecture" is stored in form of a keyword associated with a data type addressed as regional information of Kanagawa Prefecture, and so on. Two or more data types such as regional information of the Tokyo metropolitan area, and regional information of Kanagawa Prefecture, correspond to examples of two or more data types referred to in the present invention. Two or more keywords such as "the Tokyo metropolitan area" and "Kanagawa Prefecture" associated with individual data types correspond to examples of two or more keywords referred to in the present invention.

The keyword database 660 shown in FIG. 6 has in addition to the regional word storage area 661 tow or more storage areas such as a music word storage area 662 associated with use of record of information regarding a music, a television program word storage area 663 associated with use of record of information regarding a television program, a photograph word storage area 664 associated with use of record of information regarding an album photography, and a movie word storage area 665 associated with use of record of information regarding a movie.

The regional word storage area 661 stores, as mentioned above, the keywords such as "the Tokyo metropolitan area"

and "Kanagawa Prefecture". The music word storage area 662 stores therein the keywords such as musical instrument names "Violin" and "Piano", etc., genre names "Classics" and "Present day", etc., composition person's names, and names of songs, etc. The television program word storage area 663 stores therein the keywords such as names of the program genre "Drama", "News", and "Comedy show", etc. The photograph word storage area 664 stores therein the keywords such as the theme etc. of the photograph "Family" and "Travel", etc. The movie word storage area 665 stores the keywords such as genre names "Love story" and "War", etc., the production country names "United States" and "Japan", etc., the titles, names of the supervisor, names of the actor, names of the actress, and the production ages, etc.

The data analyzing section 620 shown in FIG. 5 counts the number of files to be used in at least part of the file name regarding individual one of two or more keywords in the storage area associated with the use that is informed from the object selecting section 610, of the keyword data base 660, and selects a keyword with most numbers of counts.

For instance, it is assumed that the use informed from the object selecting section 610 is use of record of the photograph, and data is a file of 100 pieces to which the file name "Family photograph 1" . . . , "Family photograph 60", and "Photograph explanation 1" . . . and "Photograph explanation 40". In this case, the data analyzing section 620 counts the frequency used with the file name of the above-mentioned file of 100 pieces about each key word in the photograph word storage area 664 corresponding to use of record of the photograph, and selects the key word "Family" that the number of counts is most.

In addition, the data analyzing section 620 classifies the file into six kinds of data kinds such as image data representative of an image, animation data representative of an animation, voice data representative of voice information like music, text data representative of textual information, table data representative of a table, and other data that doesn't belong to any kinds of data together with the selection of such a keyword that uses the file name, and counts how many each data kind of files exist. Two or more data kinds as mentioned above also correspond to examples of "two or more data types" referred to in the present invention. The above-mentioned six kinds of data kinds correspond to examples of "two or more kind candidates" referred to in the present invention.

For instance, it is assumed that data is the above-mentioned file of 100 pieces, each file of 60 pieces that has the file name "Family photograph 1" . . . and "Family photograph 60" is image data, and each 40 data of the file name "Photograph explanation 1" . . . and "Photograph explanation 40" is text data. In this case, the data analyzing section 620 obtains the count result in which the image data is of 60 pieces, the text data is of 40 pieces, and the remaining four kinds of data kinds are all of 0 pieces.

When the data analyzing section 620 completes the selection of the key word as explained above and the count of six kinds of data kinds ends, the data analyzing section 620 sends the selected key word and the count result to the layout determination section 630.

When the layout determination section 630 receives the key word and the count result from the data analyzing section 620, the layout determination section 630 determines the layout of the label image in accordance with the key word and the count result.

According to the present embodiment, as the layout of the label image, there is adopted a layout in which a background layout wherein a background image is disposed at a predetermined fixed position and a foreground layout consisting of description columns wherein descriptions involved in data are disposed are mutually overlapped.

The layout determination section 630 first obtains the background image in the background layout from the image database 670 in accordance with the keyword transferred from the data analyzing section 620.

Figure 7:
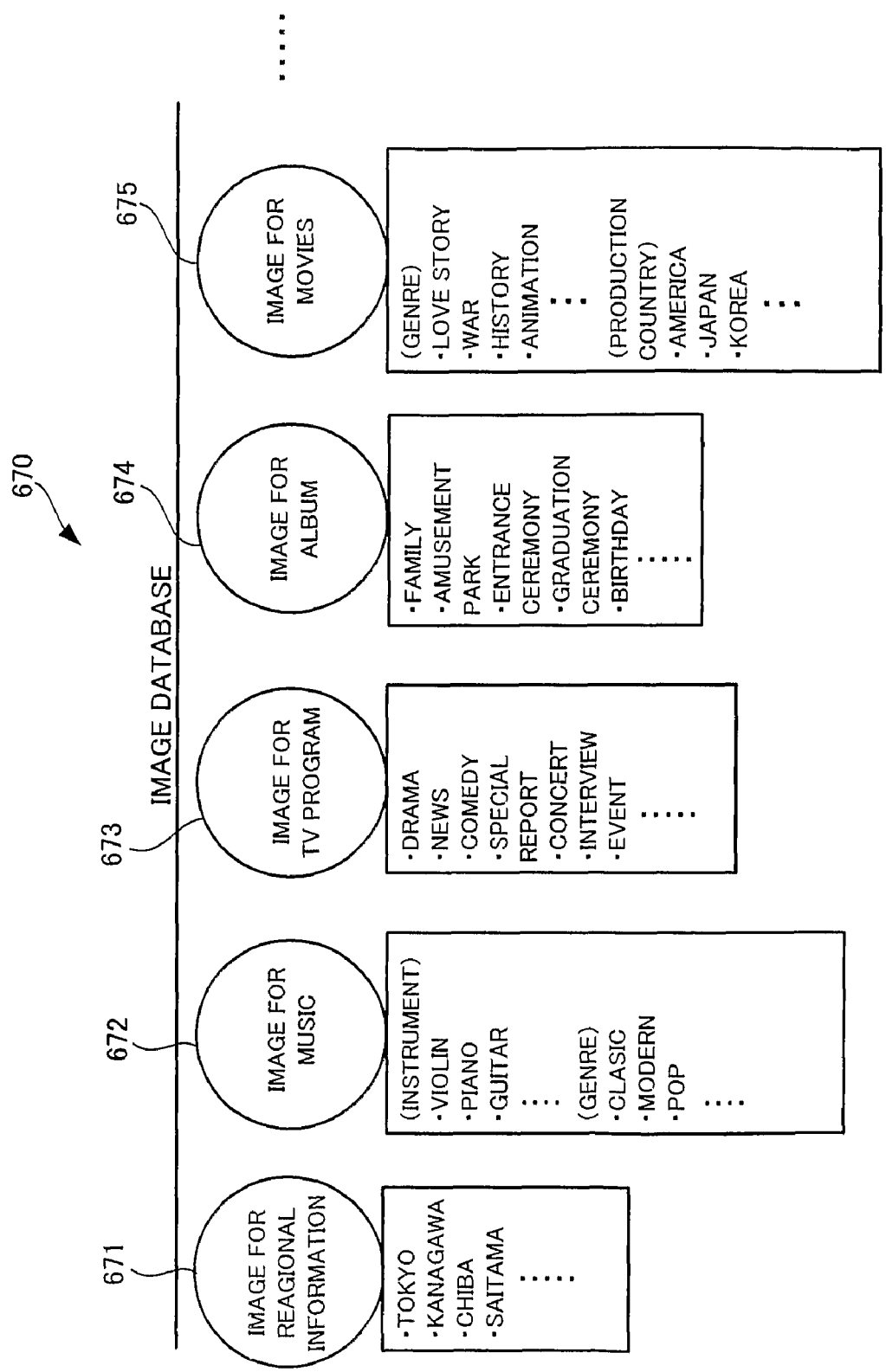
FIG. 7 is a typical illustration showing the internal parts of image database 670.

FIG. 7 is a typical illustration showing the internal parts of image database 670.

The image database 670 stores, as a candidate of the background image, the candidate image corresponding to one to one each two or more keywords in the keyword database 660 shown in FIG. 6. Those two or more candidate images are stored in the storage of two or more images installed in the image database 670 corresponding to one to one area in each two or more storage areas in the keyword database 660.

For instance, a place image storage area 671 corresponding to the regional word storage area 661 shown in FIG. 6 stores for instance the image to image Tokyo, the image to image Kanagawa Prefecture, and so on in association with the key word "Tokyo", "Kanagawa Prefecture", and so on, respectively.

According to the present embodiment, as mentioned above, the background layout in the layout of the label image is created in such a manner that the background image is disposed at a predetermined fixed position, and therefore, when the background image is determined, the background layout is also determined uniquely. In other words, according to the present embodiment, for instance, the background layout, wherein the background image is disposed at a predetermined fixed position, corresponds to each two or more candidate images such as the image to make the above-mentioned Tokyo image, Kanagawa Prefecture, and so on. Two or more background layouts, which correspond to the two or more candidate images, respectively, correspond to examples of "two or more layouts" referred to in the present invention.

Likely, two or more candidate images, which are associated with the above-mentioned key words, are stored in individual storage areas such as a music image storage area 672, a television program image storage area 673, a photograph image storage area 674, and a movie image storage area 675, which are provided in association with in individual storage areas such as the music word storage area 662, the television program word storage area 663, the photograph word storage area 664, and the movie word storage area 665, shown in FIG. 6, respectively.

According to the above-mentioned description, there is shown an example in which the data analyzing section 620 receives information of use addressed as the record of the photograph as use from the object selecting section 610 shown in FIG. 6. Hereinafter, let us consider operation of the layout determination section 630 in this case.

In this case, the layout determination section 630 selects as the background image the candidate image to make the family corresponding to the key word "Family" image from among two or more candidate images in the photograph image storage area 674 corresponding to use of record of the photograph of the image database 670 shown in FIG. 7. The layout determination section 630 determines the background image in this manner, and creates the background layout in such a manner that the background image, which makes the family image, is disposed at a predetermined fixed position.

In addition, the layout determination section 630 creates the above-mentioned foreground layout in the layout image in accordance with the count result of six kinds of data kinds mentioned above as follows.

According to the present embodiment, the layout determination section 630 corrects the foreground layout of default where six description columns corresponding to each six kinds of data kinds are provided in accordance with the count result sent from the data analyzing section 620, and thereby creating the final foreground layout.

The foreground layout of default corresponds to an example of the basic layout referred to in the present invention. Each six description columns of the foreground layout of default corresponds to an example of the description column referred to in the present invention.

Figure 8:
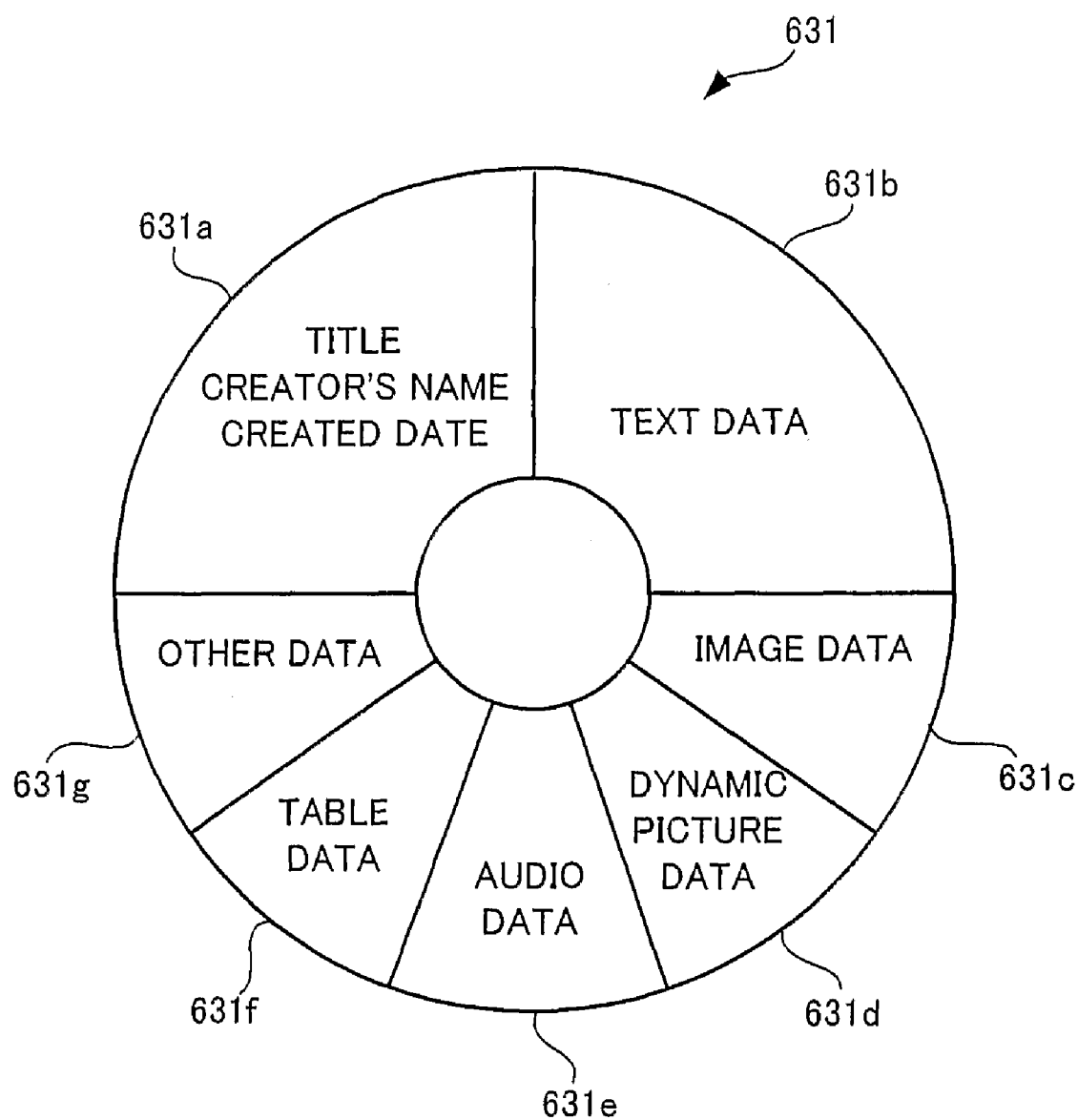
FIG. 8 is a view showing a foreground layout of a default having 6 description columns.

FIG. 8 is a view showing a foreground layout of a default having six description columns.

As shown in FIG. 8, a foreground layout 631 of default has a common description column 631a wherein a title of the recorded media informed from the object selecting section 610, a name of the creator, and a created date are described. The foreground layout 631 of default further has a description column 631b for text data, a description column 631c for image data, a description column 631d for dynamic picture data, a description column 631e for audio data, a description column 631f for table data, and a description column 631g for other data.

The layout determination section 630 shown in FIG. 5 corrects an area each six description columns except the common description column 631a in the foreground layout 631 of default in accordance with the count result transmitted from the data analyzing section 620, and creates a final foreground layout.

Figure 9:
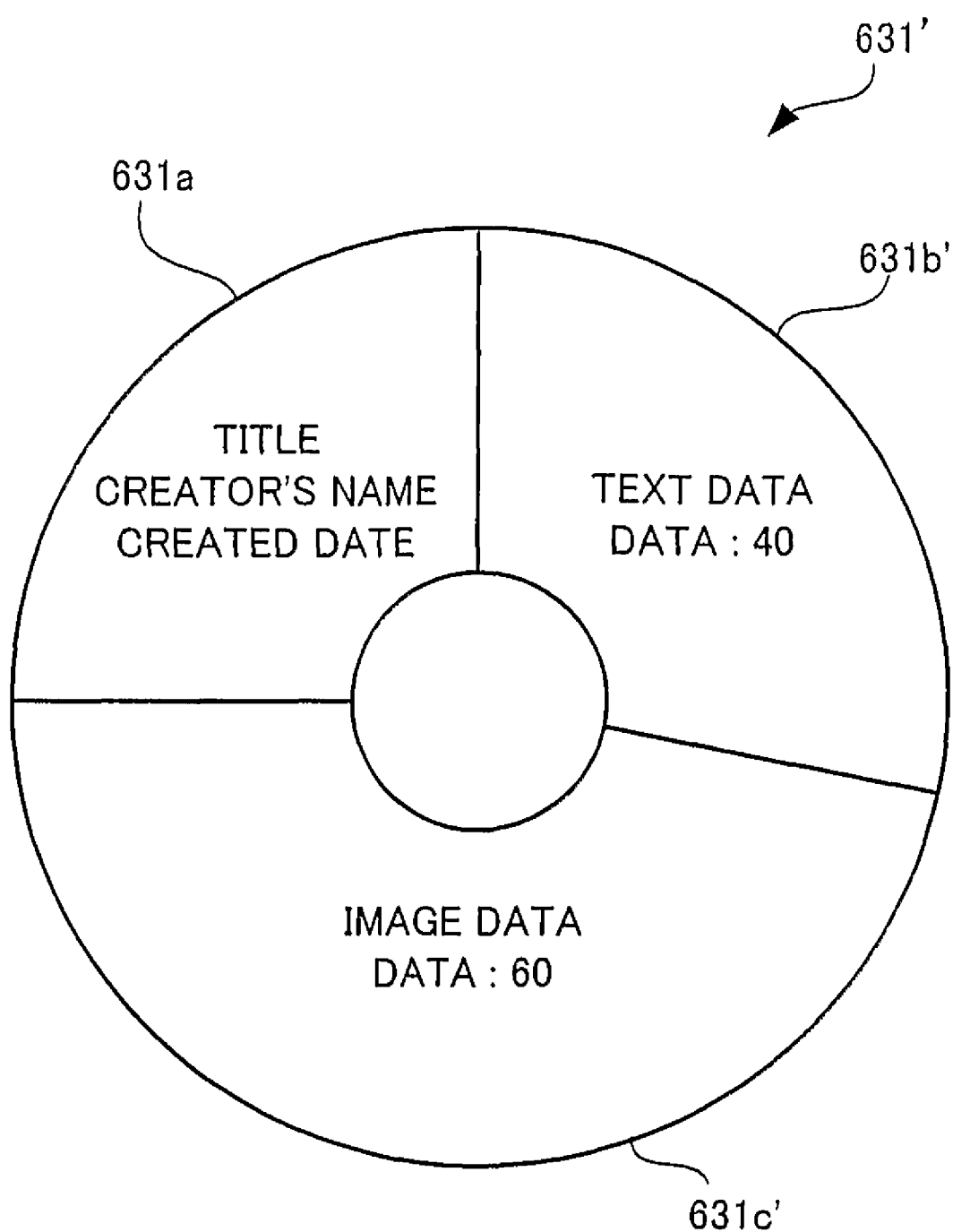
FIG. 9 is a view showing an example of the final foreground layout determined by a layout determination section 630.

FIG. 9 is a view showing an example of the final foreground layout determined by the layout determination section 630.

The example shown in FIG. 9 corresponds to the example that the data analyzing section 620 obtains the count result in which the image data is of 60 pieces, the text data is of 40 pieces, and the remaining four kinds of data kinds are all of 0 pieces.

In this case, the layout determination section 630 shown in FIG. 5 deletes, from the foreground layout 631 of default shown in FIG. 8, the description column 631d for dynamic picture data, which is associated with a count result of 0 pieces, the description column 631e for audio data, the description column 631f for table data, and the description column 631g for other data. And, as shown in FIG. 9, the areas except the common description column 631a are divided in a ratio of 2:3 in accordance with the number of counts of text data and the number of counts of image data. The area corresponding to the ratio of "2" is referred to as a final description column 631b' for the text data, and the area corresponding to the ratio of "3" is referred to as a final description column 631c' for the image data, so that the final foreground layout 631' is completed.

When the above-mentioned background layout and the final foreground layout are determined in the manner as mentioned manner, the layout determination section 630 makes the layout of this label image by combining these two layouts as follows.

Figure 10:
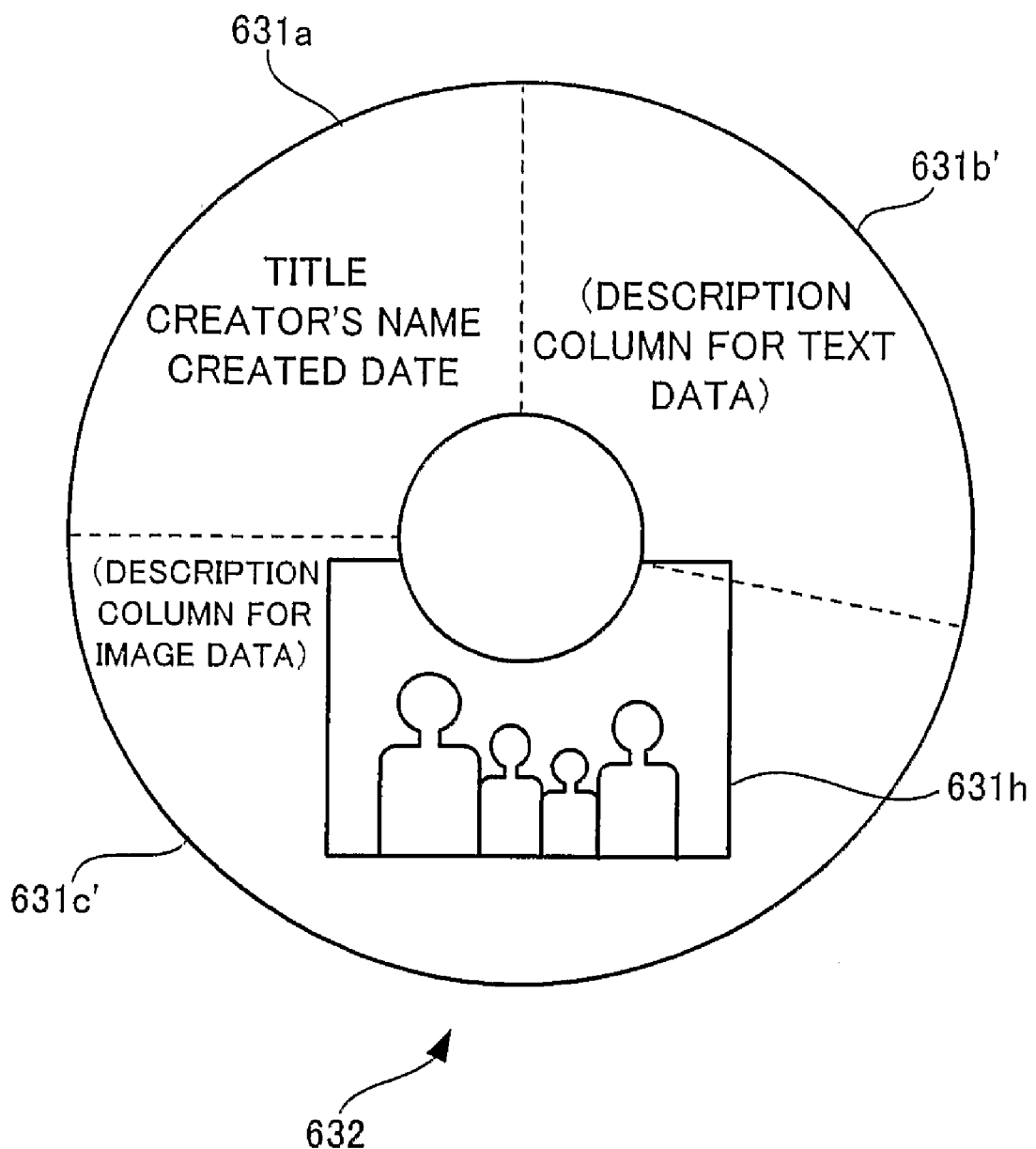
FIG. 10 is a view showing an example of the layout of the label image determined by a layout determination section 630.

FIG. 10 is a view showing an example of the layout of the label image determined by a layout determination section 630.

The example of FIG. 10 is a layout of a label image which is created by the use of the background layout having a candidate image 631h to make the family image as the background image, and the final foreground layout 631' shown in FIG. 9.

The layout determination section 630 creates a layout 632 of the label image by overlapping a final foreground layout with the background layout.

According to the label image which is created in accordance with the layout as shown in FIG. 10 by way of the example, it is possible to associate the content of the record of the DVD 300. This layout has a description column in which the description that relates to data is arranged according to the data kind. Therefore, according to the label image which is created in accordance with this layout, it is possible to understand the breakdown of the content of the record from the described description. In addition, it is easy to see these descriptions in the label image because of the preparation for the description column of the data kind of the area corresponding to the number of records as such a description column. Moreover, according to the present embodiment, such a desirable layout is automatically created, and thus the user's load in the label image creation is reduced.

The layout determination section 630 informs the layout display section 640 shown in FIG. 5 of the thus created layout.

The layout display section 640 first creates the label image of default as set forth in accordance with the layout informed from the layout determination section 630.

Figure 11:
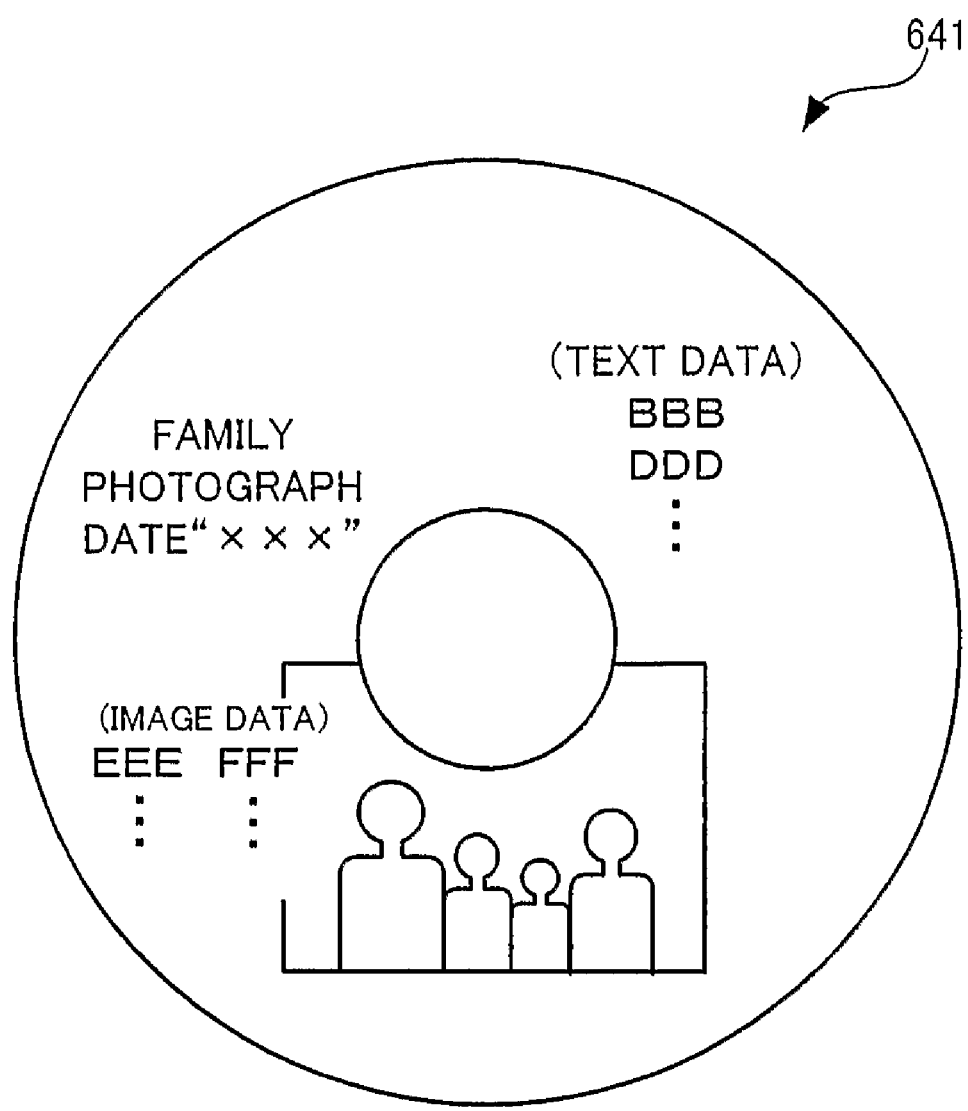
FIG. 11 is a view showing an example of the label image of the default.

FIG. 11 is a view showing an example of a label image of default.

A label image 641 of the default shown in FIG. 11 is created in accordance with the layout 632 shown in FIG. 10. Hereinafter, there will be explained an operation of the layout display section 640 in conjunction with FIG. 11.

The layout display section 640 first disposes the above-mentioned title "Family photograph", the manufacturer's name "AAA", and the date "xxx" at a prescribed position in a common description column 631a shown in FIG. 10. And then the layout display section 640 disposes the file names "BBB", "DDD", . . . of the text data, of data to be recorded on the DVD 300, or data which are already recorded, at a prescribed position in a description column 631b' of the text data shown in FIG. 10. Further, the layout display section 640 disposes the file names "EEE", "FFF", . . . of the image data at a prescribed position in a description column 631c' of the image data shown in FIG. 10 to complete the label image 641 of the default.

Then, the layout display section 640 displays the thus completed label image 641 of the default on a predetermined display screen and transfers the same to the image creating section 650.

The image creating section 650 first accepts the correction by the user operation for the content of the description, the description position in each description column, and the size of the described character to the label image 641 of the default that is displayed by the layout display section 640. In the event that the image creating section 650 receives such a correction from the user, the image creating section 650 completes the final label image through reflecting the correcting content on the label image 641 of the default. Thereafter, the image creating section 650 transmits to the DVD drive 200 image data representative of the completed final label image. When the DVD is loaded on the DVD drive 200 in such a manner that the label side is made downward as mentioned above, the label image is written on the label side in accordance with the image data that has been sent from the image creating section 650.

As mentioned above, according to the present embodiment, there is automatically determined a layout which is preferable for creating a desired label image, and thus it is possible to create the desired label image in accordance with the preferable layout.

In the above description, as an example of the recording media referred to in the present invention, there is shown, by way of example, a label plotting type of DVD which is capable of outputting an optical image onto the label side. However, the present invention is not restricted to a label plotting type of DVD, and the recording media referred to in the present invention may be for instance a label plotting type of CD-R and CD-RW which is capable of outputting an optical image onto the label side, or alternatively a label non-output type of DVD, CD-R, CD-RW, or flexible disk (FD) wherein a seal on which the label image is printed is stuck on the label side. While the concrete example of the label plotting type of DVD was not referred in the above description, as the label plotting type of DVD, for instance, DVD for Labelflash (registered trademark) and DVD for Lightscribe (registered trademark) are enumerated. In the event that the DVD for Labelflash (registered trademark) is used, there is needed a DVD drive for Labelflash (registered trademark). In the event that the DVD for Lightscribe (registered trademark) is used, there is needed a DVD drive for Lightscribe (registered trademark).

In the above description, as an example of the label image plotting apparatus referred to in the present invention, there is shown, by way of example, a label plotting type of DVD drive 200 having a function of outputting a label image onto the label side opposite to the data side of the DVD. However, the present invention is not restricted to a label plotting type of DVD drive 200, and the label image plotting apparatus referred to in the present invention may be for instance one in which a label image is outputted onto an area of the data side wherein no data is recorded.

In the above description, as an example of the label image plotting apparatus referred to in the present invention, there is shown, by way of example, the DVD drive 200 for performing recording of data onto the DVD and outputting of a label image onto the label side. However, the present invention is not restricted to such a label plotting type of DVD drive 200, and the label image plotting apparatus referred to in the present invention may be for instance a printer for outputting a label image onto a seal to be stuck on a label non-output type of recording media (for example DVD, CD-R, CD-RW, FD), or a printer for label in which a label image is formed on an ink-ejection basis onto a label side of the label non-output type of recording media.

Moreover, in the above description, as an example of the layout display section referred to in the present invention, there is shown, by way of example, the layout display section 640 in which the created layout is displayed in form of a label image of default wherein a file name of data to be recorded on the DVD is disposed in the layout. However, the present invention is not restricted to the layout display section 640, and the layout display section referred to in the present invention may be for instance one in which the created layout is directly displayed. In this case, the label image is created in such a way that the description onto the description column in the displayed layout is obtained through a user's operation and the like.

As mentioned above, it is possible to obtain a label image editing apparatus capable of easily editing a preferable label image, a label image editing plotting system capable of easily editing the preferable label image to plot the edited label image on the label side of the recording media, and a label image editing program storage medium for storing a label image editing program which causes a computer to operate as the label image editing apparatus as mentioned above.

The invention claimed is:

1. A label image editing apparatus comprising:
   a label image editing section that edits label image on a recording media having a data side on which data is recorded, and a label side on which a label image is plotted to visually confirm recording contents on the data side;
   a data analyzing section that analyzes data to be recorded on the recording media and/or data to be reproduced from the recording media;
   a layout display section that displays, as a layout of the label image, a layout according to an analyzing result by the data analyzing section, wherein
   the data analyzing section classifies data into two or more types in accordance with a prescribed classification rule, and determines the type with most numbers of data,
   the label image editing apparatus further comprises a layout selecting section that selects, from among two or more layouts associated with said two or more types, respectively, a layout corresponding to the type determined by the data analyzing section, and
   the layout display section displays the layout selected by the layout selecting section.

2. A label image editing apparatus according to claim 1, wherein the label image editing apparatus further comprises an image creating section that creates the label image using the layout displayed by the layout display section.

3. A label image editing apparatus according to claim 1, wherein the label image editing apparatus further comprises an image creating section that creates the label image on the layout displayed by the layout display section in accordance with an operation.

4. A label image editing apparatus according to claim 1, wherein the label image editing apparatus further comprises a layout selecting section that selects, from among two or more candidates of the layout, a layout according to an analyzing result by the data analyzing section, and
   the layout display section displays the layout selected by the layout selecting section.

5. A label image editing apparatus according to claim 1, wherein the label image editing apparatus further comprises a layout correcting section that corrects a basic layout, which is a base of the layout, in accordance with an analyzing result by the data analyzing section, and
   the layout display section displays the layout corrected by the layout correcting section.

6. A label image editing apparatus according to claim 1, wherein the data analyzing section classifies data into two or more types based on a prescribed classification rule, and determines numbers of data of individual type,
   the label image editing apparatus further comprises a layout correcting section that corrects an area of a description column of a basic layout, where description column for each two or more of the types is provided, in accordance with the numbers of data of individual type determined by the data analyzing section, and
   the layout display section displays the layout corrected by the layout correcting section.

7. A label image editing apparatus according to claim 1, wherein the data is data to which a name is fixed, and
   the data analyzing section has two or more keywords associated with two or more types, respectively, and determines a type with most data in which the associated keyword is used for at least part of the name among said two or more types.

8. A label image editing apparatus according to claim 1, wherein the data analyzing section classifies data into two or more types in accordance with a classification rule according to an operation among a predetermined plurality of classification rules.

9. A label image editing apparatus according to claim 1, wherein the recording media has a data side on which data is recorded with light, and a label side on which a label image is plotted with the light.

10. A label image editing plotting system comprising:
a label image editing apparatus for editing a label image on a recording media having a data side on which data is recorded, and a label side on which a label image is plotted to visually confirm recording contents on "the data side, the label image editing apparatus comprising:
a data analyzing section that analyzes data to be recorded on the recording media and/or data to be reproduced from the recording media;
a layout display section that displays, as a layout of the label image, a layout according to an analyzing result by the data analyzing section;
a label image plotting apparatus for plotting on the label side the label image edited by the label image editing apparatus, wherein
the data analyzing section classifies data into two or more types in accordance with a prescribed classification rule, and determines the type with most numbers of data,
the label image editing apparatus further comprises a layout selecting section that selects, from among two or more layouts associated with said two or more types, respectively, a layout corresponding to the type determined by the data analyzing section, and
the layout display section displays the layout selected by the layout selecting section.

11. A non-transitory label image editing program storage medium storing a label image editing program which causes a computer to operate as a label image editing apparatus, when the label image editing program is incorporated and executed in the computer, wherein the label image editing apparatus comprising:
a label image editing section that edits label image on a recording media having a data side on which data is recorded, and a label side on which a label image is plotted to visually confirm recording contents on the data side;
a data analyzing section that analyzes data to be recorded on the recording media and/or data to be reproduced from the recording media;
a layout display section that displays, as a layout of the label image, a layout according to an analyzing result by the data analyzing section, wherein
the data analyzing section classifies data into two or more types in accordance with a prescribed classification rule, and determines the type with most numbers of data,
the label image editing apparatus further comprises a layout selecting section that selects, from among two or more layouts associated with said two or more types, respectively, a layout corresponding to the type determined by the data analyzing section, and
the layout display section displays the layout selected by the layout selecting section.

* * * * *